US007698531B2

(12) United States Patent
Flemming et al.

(10) Patent No.: US 7,698,531 B2
(45) Date of Patent: Apr. 13, 2010

(54) WORKLOAD MANAGEMENT IN VIRTUALIZED DATA PROCESSING ENVIRONMENT

(75) Inventors: Diane G. Flemming, Pflugerville, TX (US); Octavian F. Herescu, Austin, TX (US); William A. Maron, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 11/692,537

(22) Filed: Mar. 28, 2007

(65) Prior Publication Data

US 2008/0244215 A1 Oct. 2, 2008

(51) Int. Cl.
G06F 12/00 (2006.01)
(52) U.S. Cl. ........................ 711/173; 709/224
(58) Field of Classification Search .......... 718/105; 711/173, 170, 129, 118, 119, 113, 202, 203; 709/224; 707/100, 2, 200
See application file for complete search history.

(56) References Cited

U.S. PATENT DOCUMENTS

| 4,843,541 | A | 6/1989 | Bean et al. |
| 5,222,215 | A | 6/1993 | Chou et al. |
| 5,691,920 | A | 11/1997 | Levine et al. |
| 5,765,017 | A | 6/1998 | Hoy et al. |
| 6,243,788 | B1 | 6/2001 | Franke et al. |
| 6,282,570 | B1 * | 8/2001 | Leung et al. ............ 709/224 |
| 6,598,069 | B1 * | 7/2003 | Rooney et al. .......... 718/104 |
| 6,704,766 | B1 | 3/2004 | Goss et al. |
| 6,880,021 | B2 | 4/2005 | Easton et al. |
| 6,957,435 | B2 * | 10/2005 | Armstrong et al. ...... 718/104 |
| 7,051,188 | B1 | 5/2006 | Kubala et al. |

(Continued)

FOREIGN PATENT DOCUMENTS

EP 1965304 A1 * 9/2008

OTHER PUBLICATIONS

"IBM AS/400e Logical Partitions: Learning About", http://publib.boulder.ibm.com/pubs/html/as400/v4r5/ic2924/info/rzajx.pdf, Copyrigt 1999, 2000.*

(Continued)

Primary Examiner—Pierre-Michel Bataille
(74) Attorney, Agent, or Firm—Dillon & Yudell LLP

(57) ABSTRACT

A system, method and computer-readable medium for balancing access among multiple logical partitions to the physical system resources of a computer system employing system virtualization. Each of the logical partitions is classified, initially during a startup period, in accordance with a level of allocated dispatch window utilization. Performance metrics of one or more of the physical system resources are determined in association with one or more of the logical partitions. The performance metrics determination is performed at a hardware level independent of programming interrupts. During a dispatch window in which a given set of the physical system resources are configured for allocation to one of the logical partitions, the given set of physical system resources are re-allocated to a replacement logical partition in accordance with the determined performance metrics associated with the replacement logical partition and the dispatch window utilization classification of the replacement logical partition.

18 Claims, 11 Drawing Sheets

U.S. PATENT DOCUMENTS

| | | | |
|---|---|---|---|
| 7,281,097 B1 * | 10/2007 | Lawson et al. | 711/154 |
| 7,313,796 B2 * | 12/2007 | Hamilton et al. | 718/104 |
| 2001/0001872 A1 * | 5/2001 | Singh et al. | 711/129 |
| 2005/0240925 A1 | 10/2005 | Ault et al. | |
| 2006/0123196 A1 | 6/2006 | Dunshea et al. | |
| 2006/0230400 A1 | 10/2006 | Armstrong et al. | |
| 2007/0226177 A1 * | 9/2007 | Barsness et al. | 707/2 |

OTHER PUBLICATIONS

"Navisphere Quality of Service Manager (NQM)", Applied Technology, White Paper, Copyright Oct. 2006, EMC Corporation. 13 pages.*

"Using Navisphere QoS Manager in Oracle Database Deployments", Applied Technology, White Paper, © 2006 EMC Corporation, Nov. 2006, pp. 1-10.*

\* cited by examiner

WORKLOAD MANAGEMENT IN VIRTUALIZED DATA PROCESSING ENVIRONMENT

CROSS-REFERENCE TO RELATED APPLICATIONS

The present application is related to the following co-pending U.S. Patent Applications: U.S. patent application Ser. No. 11/692,338 filed on Mar. 28, 2007, titled "WORKLOAD MANAGEMENT IN VIRTUALIZED DATA PROCESSING ENVIRONMENT"; U.S. patent application Ser. No. 11/692,346 filed on Mar. 28, 2007, titled "WORKLOAD MANAGEMENT IN VIRTUALIZED DATA PROCESSING ENVIRONMENT"; and U.S. patent application Ser. No. 11/692,276 filed on Mar. 28, 2007, titled "METHOD TO CAPTURE HARDWARE STATISTICS FOR FOOTPRINT CALCULATION, DISPATCHING EFFICIENCY AND SCHEDULING EFFICIENCY." The above-mentioned patent applications are assigned to the assignee of the present invention and are incorporated herein by reference.

BACKGROUND OF THE INVENTION

1. Technical Field

The present invention relates generally to managing workloads in a data processing system. More particularly, the present invention relates to managing workloads in a partitioned system such as a logically partitioned system.

2. Description of the Related Art

Logical partitioning of computer resources allows the establishment of multiple system images within a single physical machine or processor complex. Virtualization is a term designating system imaging in which each system image, known also as a virtual machine (VM), operates in a logically independent manner from the other VMs using shared resources of the physical computer system. In this manner, each logical partition corresponding to a VM can be independently reset, loaded with an operating system that may be different for each partition, and operate with different software programs using different input/output (I/O) devices. Commercial embodiments of logically partitioned systems include, for example, IBM Corporation's POWER5 multi-processor architecture.

An important aspect of logical partitioning is management of the respective partition workloads. In POWER5, for example, a workload manager called a hypervisor manages the workload among the partitions. In this type of shared resource environment, the hypervisor allocates physical system resources such as memory, central processing units (CPUs), I/O, etc., to the logical partitions using an interleaved time slot scheduling technique similar in a broad sense to general multitask computing scheduling. The hypervisor attempts to balance the workload of the partitions by dispatching partition work as logical processors to the physical system resources on an as needed and/or pre-allocated manner.

One aspect of partition scheduling relates specifically to processor resource utilization and sharing. Namely, partitions using processor capacity from a shared processor pool are defined as either capped or uncapped for scheduling purposes. A capped partition cannot exceed its configured processor entitlement. Uncapped support for logical partitions enables uncapped partitions to exceed their configured capacity in situations where there is unutilized capacity in the shared processor pool. Such unutilized capacity results from other partitions underutilizing all of their configured capacity or the capacity of the shared pool otherwise not being completely allocated.

When dispatched, a logical partition subsumes the allocated physical processor resources as a logical processor. The scheduling of logical processors (sometimes referred to as virtual processors) entails allocating pre-specified periods of time, or timeslices, during which processing cycles, memory, and other physical system resources are allocated for use by the partitions during a given dispatch window. The AIX operating system running on POWER5, for example, has a default 10 msec dispatch window. Any unused portion of an allocated dispatch window may be allocated to one or more of the uncapped partitions in the system. A lottery mechanism based on the uncapped partitions' priority levels is often utilized to determine which uncapped partition will replace the originally scheduled partition for the unused portion of the dispatch window.

While relatively simple and computationally inexpensive, the foregoing replacement dispatch technique does not adequately address potential inefficiencies relating to the logic structure and functional characteristics of the partitions. A significant source of scheduling inefficiency arises when replacing so-called interactive partitions during their respective dispatch windows. A partition is characterized as "interactive", or in the alternative as "batch," based on its reliance on external processing events and corresponding likelihood of interruption during a given dispatch window. A batch partition is largely independent of responses from external events and thus typically utilizes its entire dispatch window. Interactive partitions, in contrast, commonly suspend activity during dispatch windows waiting for external event responses.

To profitably utilize the otherwise unused cycles of a dispatch window in which an interactive partition has suspended work, the hypervisor may attempt to replace the suspended partition using the aforementioned prioritized lottery mechanism. It many cases, however, the suspended partition is waiting for an imminent external event response and is therefore likely to require additional cycles to complete a task that, notwithstanding the present suspended condition of the partition, would otherwise be completed within the current dispatch window sans partition replacement.

Dispatch window cycles are wasted if the suspended partition is not replaced during the period of partition inactivity. On the other hand, while enabling profitable utilization of the otherwise wasted dispatch window cycles, conventional partition replacement techniques fail to address the computational cost of interrupting the interactive processing of a replaced interactive partition. Such an interruption results in the need to re-queue the replaced interactive partition and cycle back through the queue to re-dispatch the partition. Unlike dedicated systems, virtual systems require the memory footprint to be re-established for each dispatch. Therefore, in addition to having to be re-queued, a replaced interactive partition must expend additional cycles to restore the memory footprint, which is a significant source of workload management inefficiency in a virtualized system.

Conventional logical partition management fails to address the foregoing and many other issues relating to partition scheduling and runtime workload balancing. It can therefore be appreciated that a need exists for a method, system, and computer program product for managing scheduling and workload balancing among logical partitions. The present invention addresses these and other needs unresolved by the prior art.

SUMMARY OF THE INVENTION

A system, method, and computer-readable medium for balancing access among multiple logical partitions to the physical system resources of a computer system employing system virtualization are disclosed herein. Each of the logical partitions is classified during a startup period in accordance with a level of allocated dispatch window utilization. Performance metrics of one or more of the physical system resources are determined in association with one or more of the logical partitions. The performance metrics determination is performed during dispatch of the partitions using hardware detection and tracking logic independent of programming interrupts. During a dispatch window in which a given set of the physical system resources are configured for allocation to one of the logical partitions, the given set of physical system resources are re-allocated to a replacement logical partition in accordance with the determined performance metrics associated with the replacement logical partition and the dispatch window utilization classification of the replacement logical partition.

In another aspect, a method, system, and computer program product for balancing workload among multiple logical partitions that share physical system resources utilize memory footprint statistics to determine partition replacement eligibility and priority. The method includes determining performance metrics of one or more of the physical system resources in association with the logical partitions and using the performance metrics to determine memory footprint values. During a dispatch window in which a given set of the physical system resources are allocated to one of the logical partitions, the given set of the physical system resources are re-allocated to another of the logical partitions in accordance with the determined memory footprint values.

In another aspect, a method, system, and computer program product are disclosed for dynamically tuning a scheduler that schedules multiple logical partitions that share physical system resources during a given dispatch window. The method includes dispatching the logical partitions using pre-configured dispatch window periods during a system startup period. During logical partition dispatching, performance metrics of one or more of the physical system resources are determined in association with the logical partitions. The partition-associated performance metrics are utilized to determine memory footprint values for the logical partitions which, among other scheduling heuristics are utilized to dynamically determine scheduling of partitions during a dispatch window period.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
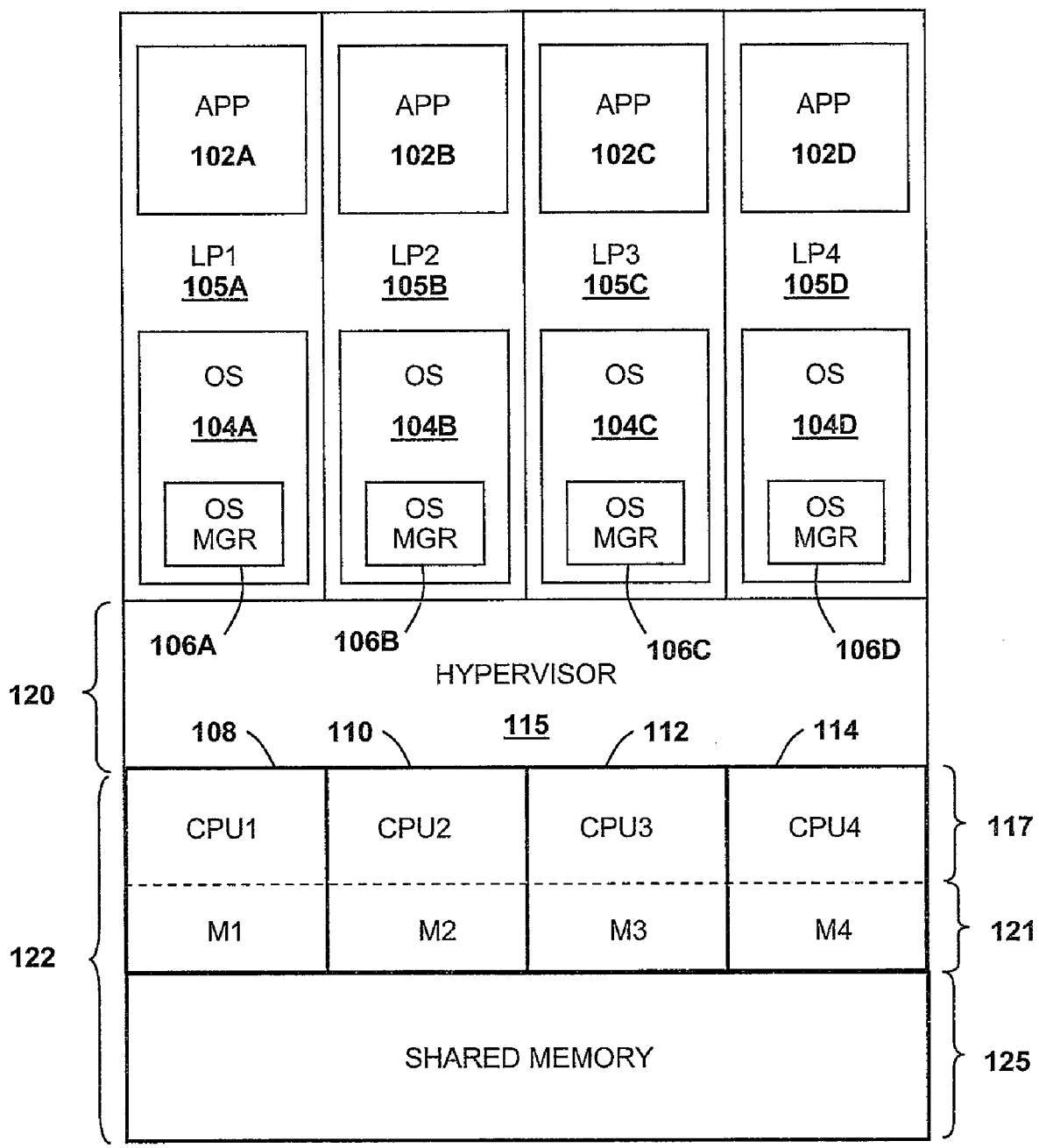
FIG. 1 illustrates a virtualized computing system adapted to implement workload balancing and dispatch window tuning in accordance with the present invention.

The system and method of the present invention enable more efficient resource allocation and workload balancing within a virtualized computing environment. An exemplary virtualized computing environment includes multiple logical partitions with the workload being managed among two or more of the partitions. As utilized herein, the term partition refers generally to a subset of data processing hardware resources allocated to an operating system. A partition may also be referred to as thread or any other computational unit. Preferred embodiments for implementing the system and method of the present invention are depicted and described below with reference to the figures wherein like reference numerals refer to like and corresponding parts throughout.

The present invention enables the dynamic redistribution of shareable resources across logical partitions under direction of a workload manager. In one aspect, the present invention achieves improved workload management and system efficiency by using a dynamically adjustable partition scheduling mechanism. The partition scheduling mechanism features a hardware tracking mechanism, which in one embodiment determines partition performance metrics relating to establishment of a memory footprint as a partition scheduling metric. In another aspect, the present invention utilizes hardware-tracked memory footprint metrics to dynamically adjust scheduling of the respective logical partitions within a dispatch window.

The present invention enables dynamic redistribution of shareable resources across logical partitions under the direction of a workload manager, which in one embodiment may be a hypervisor. These resources may include, for example, CPU resources, logical processor resources, I/O resources, coprocessors, channel resources, etc. In one embodiment, dynamic adjustment of resource allocation is accomplished by integrating hypervisor functionality with hardware and firmware partition monitoring mechanisms in a performance adjustment feedback loop for achieving workload balancing and greater overall system efficiency.

In one aspect, the present invention addresses the limits to system throughput posed by memory access latency. The invention mitigates memory latency effects by determining and utilizing memory access statistics for partition scheduling. Such memory sensitive partition scheduling improves partition scheduling decision making as well as providing greater dispatch window scheduling flexibility. In one embodiment, the present invention accounts for memory footprint set up costs in selecting a partition to preempt or otherwise replace an originally dispatched partition. The invention further accounts for the subsequent footprint set up costs for cases in which the replaced partition is re-dispatched to reclaim a portion of its original dispatch window.

With reference now to the figures wherein like reference numerals refer to like and corresponding parts throughout, one embodiment of a virtualized computing environment implementing the workload management features of the present invention is depicted in FIG. 1. A virtual computing system 100 is illustrated which includes many of the features included in the POWER5 server offered by International Business Machines Corporation, Armonk, N.Y. Virtual computing system 100 generally comprises firmware layer resources 120 including a hypervisor 115 as well as hardware layer resources 122 including a shared processor pool 117 and memory devices 121 and 125. Shared processor pool 117 preferably comprises a multiprocessor complex comprising multiple processors 108, 110, 112, and 114, designated CPU1-CPU4, respectively, and having respective processor-associated cache memories M1-M4 121. Virtual computing system 100 further comprises multiple logical partitions 105A-105D, designated LP1-LP4, respectively. Hypervisor 115 manages and adjusts assignment of hardware layer resources 122 among logical partitions 105A-105D.

CPU1-CPU4 and associated cache memories M1-M4 represent a portion of physical system resources allocated by hypervisor 115 to the logical partitions LP1-LP4 in a manner resulting in resource virtualization. Physical system resources are generally tangible system devices, components, and associated physical phenomena such as memory devices, processors, drivers, busses, processor/bus cycles, etc., as distinguished from non-physical, abstract system resources such as program layering organization and program protocols such as those associated with an operating system. Physical system resources are also distinguishable from logically or virtually definable entities such as such as virtual machines. Each of logical partitions LP1-LP4 includes one or more logical processors (not expressly depicted), each of which represents all or a portion of one of physical processors CPU1-CPU4 allocated to the partition. The logical processors of a given one of partitions 105A-105D may be dedicated to the partition, so that the underlying processor resource is reserved for that partition, or may be shared so that the underlying processor resource is available to other partitions.

In the depicted embodiment, each of logical partitions LP1-LP4 functions as a separate system having a resident operating system 104, which may differ among the partitions, and one or more applications 102. In one embodiment, one or more of operating systems 104A-104D may be the Linux operating system or the i5/OS™ operating systems offered by IBM Corporation. Additionally, operating systems 104A-104D (or a subset thereof) include respective OS workload managers 106A-106D for managing the application workload within each of the respective partitions.

In one embodiment, hypervisor 115 operates as a hidden partition having no entitled capacity. Allocation of system resources to logical partitions LP1-LP4 is managed by hypervisor 115, which may be implemented by microcode running on processors CPU1-CPU4. Hypervisor calls provide a means for any of operating systems 104A-104D to communicate with hypervisor 115, enabling more efficient usage of physical processor capacity by supporting the scheduling heuristic of minimizing partition idle time using techniques explained in further detail below. Logical partitions LP1-LP4 and hypervisor 115 typically comprise one or more tangible program modules residing in respective portions of the central memory associated with processors CPU1-CPU4.

Figure 2:
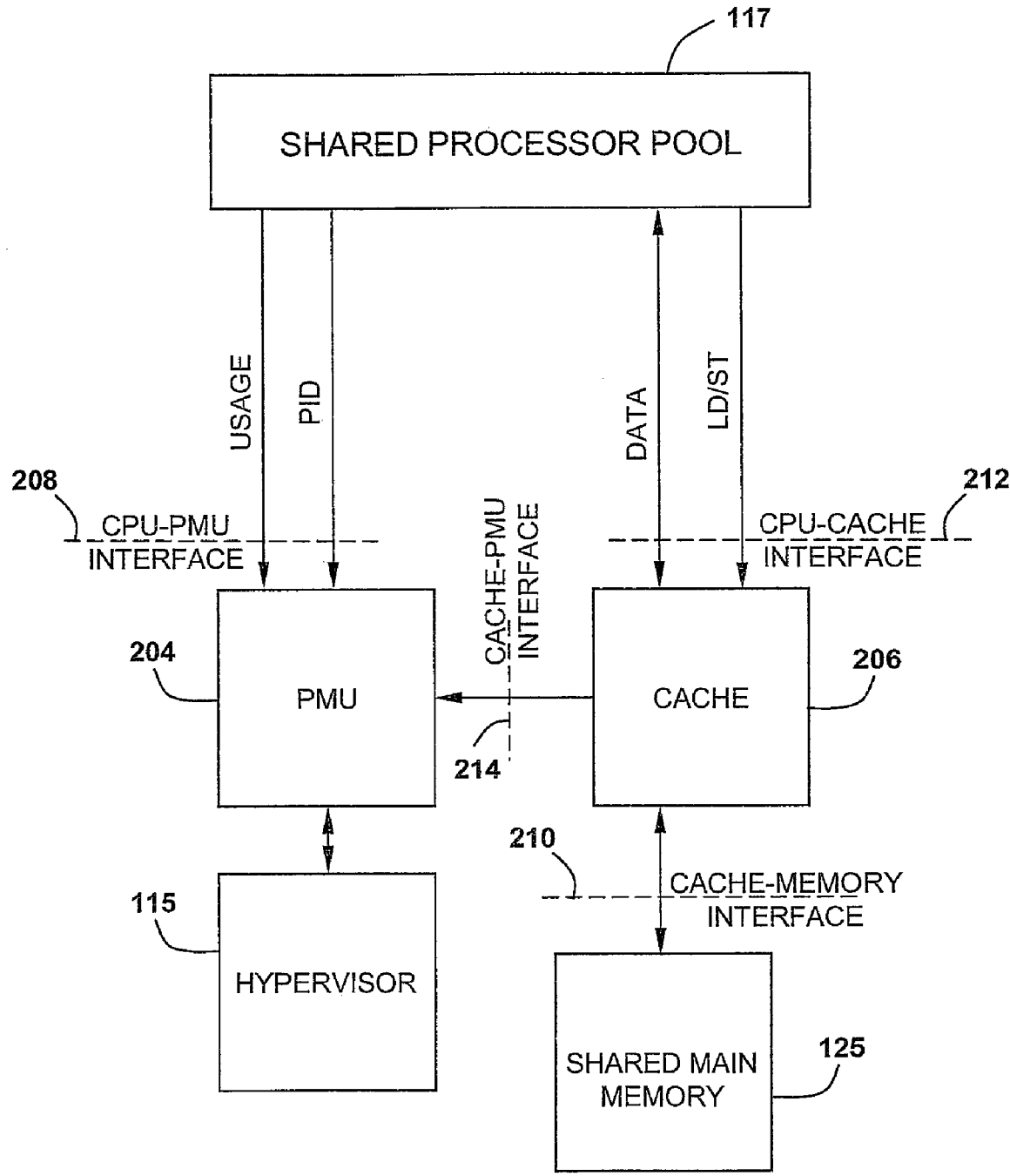
FIG. 2 is a high-level schematic diagram depicting an exemplary architecture adapted to facilitate partition scheduling in accordance with one embodiment of the present invention.

FIG. 2 is a high-level schematic diagram depicting an exemplary architecture 200 adapted to facilitate partition scheduling in accordance with one embodiment of the present invention. Partition scheduling architecture 200 integrates a partition management unit (PMU) 204 with other system components such as shared processor pool 117, hypervisor 115, and a cache memory 206. While PMU 204 is depicted as a distinct module in FIG. 2, it should be noted that some or all of the hardware, firmware, and software components of PMU 204 may be integrated within hypervisor 115. Furthermore, it should be noted that the cache block 206 is representative of some or all of the collective cache memory resources M1-M4 utilized by one or more of CPUs 108, 110, 112, and 114 contained within shared processor pool 117.

PMU 204 includes logic, program modules, and other hardware, firmware, and/or software modules that monitor physical system resource performance metrics, such as those related to memory usage, for resources allocated to partitions LP1-LP4. Such performance metrics preferably include cache usage, and particularly metrics relating to the cache footprint of each of partitions LP1-LP4. The high-level schematic of FIG. 2 illustrates the integration and interaction interfaces between PMU 204 with the other system components enabling such monitoring of physical system resources associated with the logical partitions.

When a currently dispatched logical partition executes its instruction stream using a CPU from shared processor pool 117 and accesses the content of a memory location via load or store operations, the CPU issues these requests to its associated cache 206 through a CPU-cache interface 212. The task of cache 206 is then to determine whether the memory content is present in the cache's storage and, (a) if so, return the cached data to the CPU, or (b) if not, fetch the memory content from main memory, such as shared memory 125, before performing the load or store. If the requested memory content is already in cache 206, the data is returned to the CPU without accessing shared memory 125 such as via a cache-memory interface 210. No interaction with PMU 204 is required at this point. If however, the requested data is not available in cache 206, the data must be fetched from main shared memory 125 through cache-memory interface 210.

Figure 3:
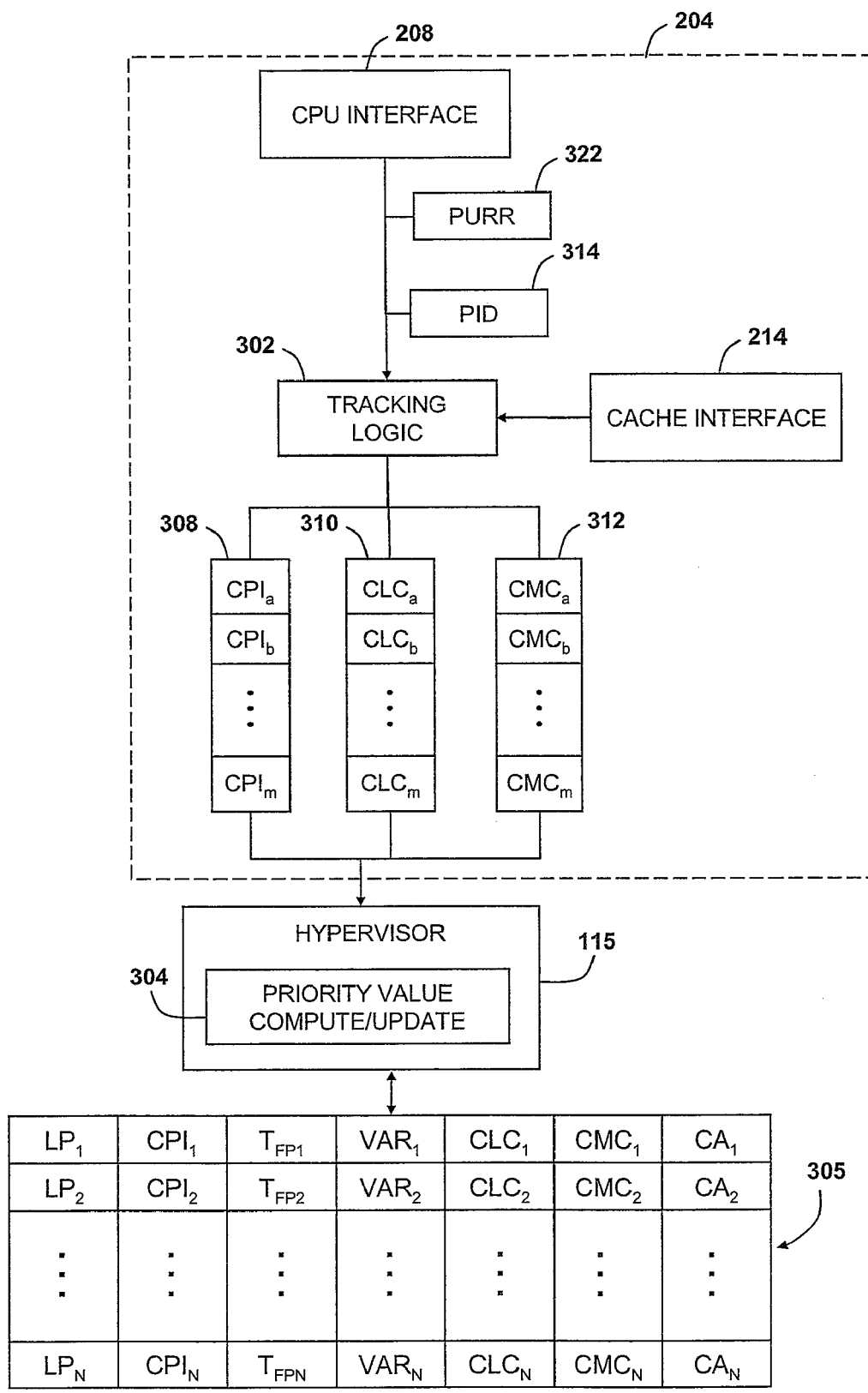
FIG. 3 is a high-level schematic diagram illustrating the internal architecture of a partition monitoring unit, hypervisor, and partition history table as may be implemented within the architecture depicted in FIG. 2.

Referring to FIG. 3, there is depicted a high-level schematic diagram illustrating the internal architecture of partition monitoring unit 204, hypervisor 115, and a partition history table 305 as may be implemented within the architecture depicted in FIG. 2. An input side includes PMU 204, which is illustrated as including a tracking logic module 302 that processes inputs from CPU interface 208 and cache interface 214 to generate partition vectors 308, 310, and 312. On its output side, the architecture comprises hypervisor 115 and partition history table 305. In the depicted embodiment, hypervisor 115 includes a priority computation module 304 that processes partition vectors 308, 310, and 312 to generate and update the content of partition history table 305. Partition history table 305 contains entries for all N of the logical partitions within virtual computing system 100. In the depicted embodiment, partition history table 305 is illustrated as including row-wise records each corresponding to one of the N logical partitions in the system wherein each partition record contains multiple column-wise data fields. Among the column-wise fields is a logical partition (LP) identifier field as well as fields for cycles per instruction (CPI) values, cache line count (CLC) values, and cache miss count (CMC) values for each of the respective logical partitions, and which are explained in further detail below. In addition to the hardware detected CPI, CLC, and CMC values, the column-wise fields for each partition table entry includes fields for a memory footprint period value, $T_{FP}$, a footprint value variation, VAR, as well as a cache affinity (CA) value which may be derived from one or more of the aforementioned CPI, CLC and CMC values.

Within PMU 204, tracking logic module 302 includes logic and data storage hardware devices for detecting, processing, and temporarily storing performance metrics of physical system resources such as the processing and memory resources depicted in FIGS. 1 and 2. The performance metrics are detected in association with logical partitions to which physical system resources such as memory and CPUs are allocated at the time of detection. The detected and processed performance metrics are stored in association with the identity of the logical partitions to which the physical resources are presently allocated. The association between a given set of performance metrics and a logical partition may be provided by a CPU interface register 314 that contains the identity of one or more currently dispatched partitions. The partition ID value within register 314 is preferably set at the time of a dispatch decision.

Exemplary performance metrics collected by tracking logic module 302 may include a CPI count, a cache line count, a cache miss count, and other memory access or processing efficiency related metrics that can be directly or computationally determined from signals detected on CPU and/or cache interfaces 208 and 214. A processor utilization resource register 322 may be utilized to provide a cycle count to measure activity during timeslices in which the partitions are dispatched on a physical processor. In the depicted embodiment, CPI counts for each of currently dispatched partitions a-m detected by tracking logic 302 are stored within dispatched partition vector 308. Similarly, cache line counts and cache miss counts for dispatched logical partitions a-m detected by tracking logic 302 are stored in dispatched partition vectors 310 and 312, respectively.

In a preferred embodiment, the detection logic and data storage devices within tracking logic module 302 include hardware and firmware devices that collect and process signals on CPU and cache interfaces 208 and 214 independently of program interrupt mechanisms, such as operating system interrupts. Such tracking and storage devices may include hardware such as logic gates, registers, etc., and firmware encoding such as that used by system bus snoopers. Tracking logic module 302 performs its detection, processing, and storage functions at a hardware and/or firmware level independent of software program interrupts. Such detection, processing, and storage functions are therefore performed independent of operating system kernel management constraints. In this manner, the sampling rate at which tracking logic module 302 collects the performance metrics may have a sufficiently fine granularity, such as 0.1 msec for example, required for determining criteria data to be used for partition scheduling and replacement as explained in further detail below.

The system performance metrics within dispatched partition vectors 308, 310, and 312 includes CPI counts, cache line counts, and cache miss counts, respectively, for each of a number a-m of currently or previously dispatched logical partitions. The association between each recorded partition vector value and a corresponding logical partition is visually represented in FIG. 3 by the subscripts a-m, wherein each of subscripts a-m represents a specified logical partition. The storage devices within tracking logic 302 that store partition vectors 308, 310, and 312 are preferably dedicated registers.

The performance metrics detected by tracking logic 302 and collected in dispatched partition vectors 308, 310, and 312, are processed by hypervisor 115 to update partition history table 305. An interrupt signal generated or received by hypervisor 115 determines when partition table 305 is to be updated using the system data collected within dispatched partition vectors 308, 310, and 312. The interrupt indicates or otherwise coincides with the expiration of the dispatch window for at least one of the dispatched partitions a-m. Upon receipt of the interrupt, priority value computation module 304 retrieves and processes partition vectors 308, 310, and 312 to populate or update entries within partition history table 305. In the depicted embodiment, responsive to the update interrupt signal, the CPI, CLC, and MC metrics within dispatched vectors 308, 310, and 312 are compared or otherwise processed with respect to the respective column-wise metric entries for the records of the corresponding logical partitions. Assuming FIG. 3 depicts an initial system startup period in which logical partitions a-m are first dispatched, priority value computation module 304 populates partition history table 305 with record entries for each of partitions a-m and enters the partition vector data from vectors 308, 310, and 312 into the corresponding record entries. The record generation process continues during a system initialization period until all N logical partitions have populated records within partition history table 305.

Following initial dispatching and consequent partition record generation for each logical partition, priority value computation module 304 continues to process dispatched vectors 308, 310, and 312 at each signaled update interval to add to, replace, or otherwise modify performance metrics and/or replacement priority value entries within partition history table 305 as explained in further detail below.

Figure 4:
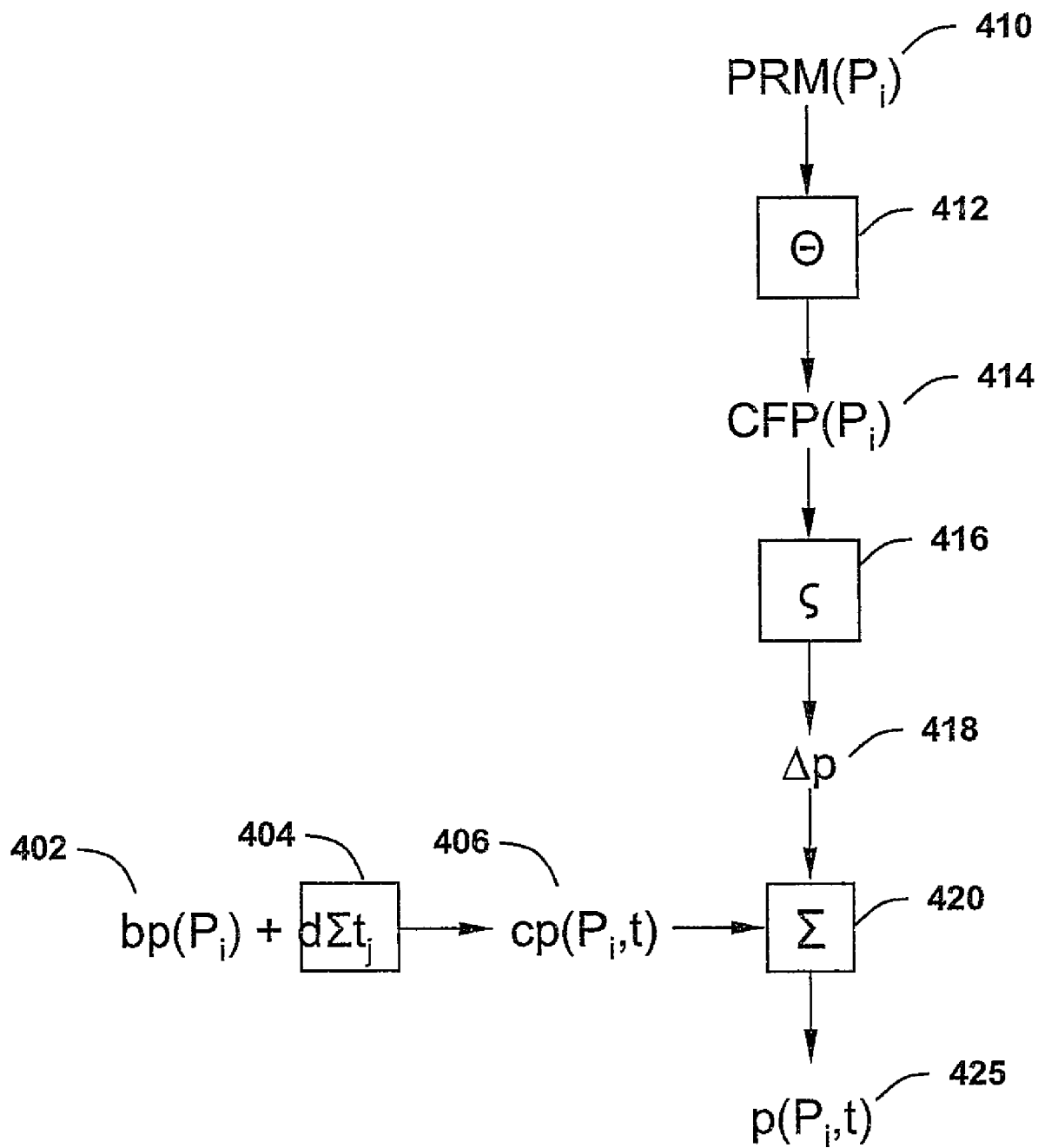
FIG. 4 is a high-level block diagram representation of a sequence for determining replacement prioritization of logical partitions in accordance with the present invention.

FIG. 4 is a high-level block diagram representation of a sequence for determining scheduling prioritization for logical partitions in accordance with the present invention. In particular, FIG. 4 depicts exemplary temporal and event-based prioritization factors such as may be utilized by hypervisor 115 in making dispatching decisions such as replacing or preempting a currently dispatched partition.

In order to integrate the prioritization as a dynamically adjustable factor within overall partition dispatch scheduling, hypervisor 115 determines the relative or absolute priority for each logical partition as a function of cache footprint related metrics and hence must retrieve the hardware detected performance metrics from PMU 204.

As explained above, the physical system performance metrics determined directly from memory and CPU bus interfaces are detected and initially registered and processed using hardware-level logic and registers within tracking logic module 302. The cache footprint metrics detected or generated by a tracking logic module 302 preferably include CPI counts, cache line counts, and cache miss counts for each dispatched partition and are collected as partition vectors 308, 310, and 312 which may be combined with other scheduling priority factors to derive an overall dispatch priority.

Figure 5:
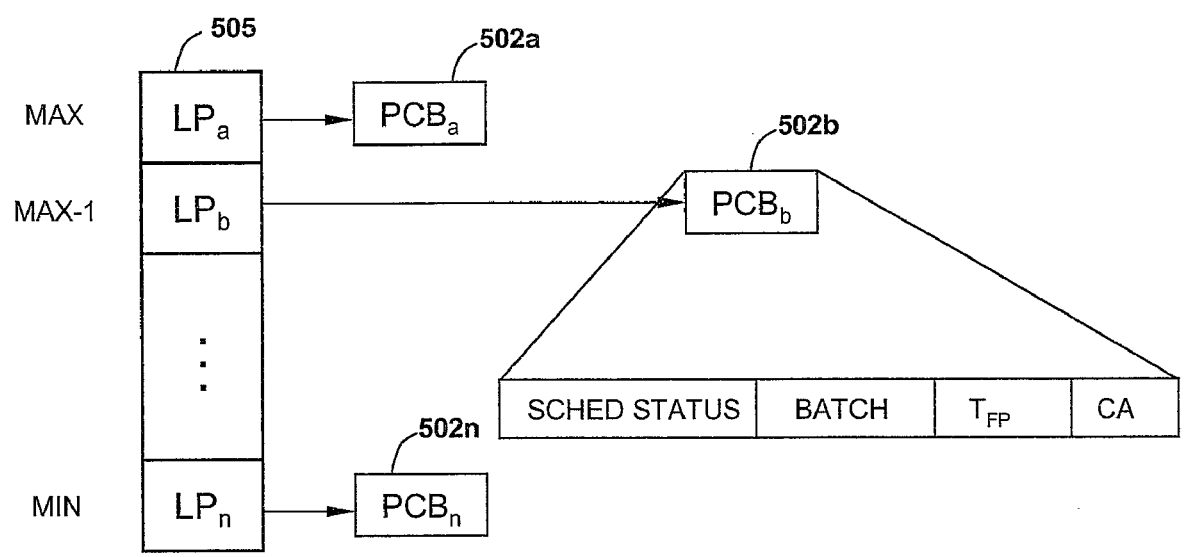
FIG. 5 is a high-level block diagram representation of a partition dispatcher state as implemented in accordance with the present invention.
Figure 6:
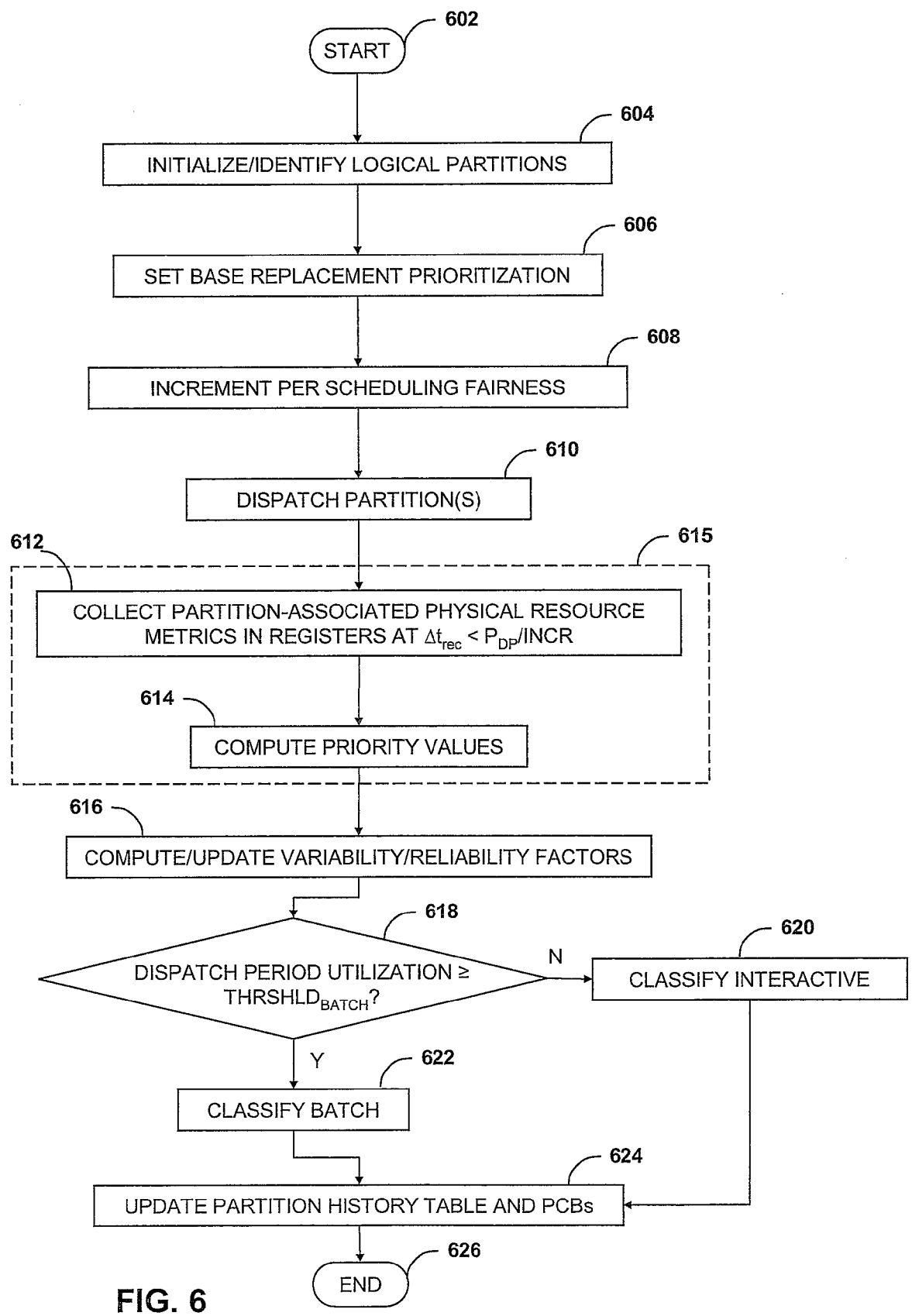
FIG. 6 is a high-level flow diagram depicting steps performed by a partition monitoring unit and dispatcher for determining replacement priority in accordance with the present invention.
Figure 7:
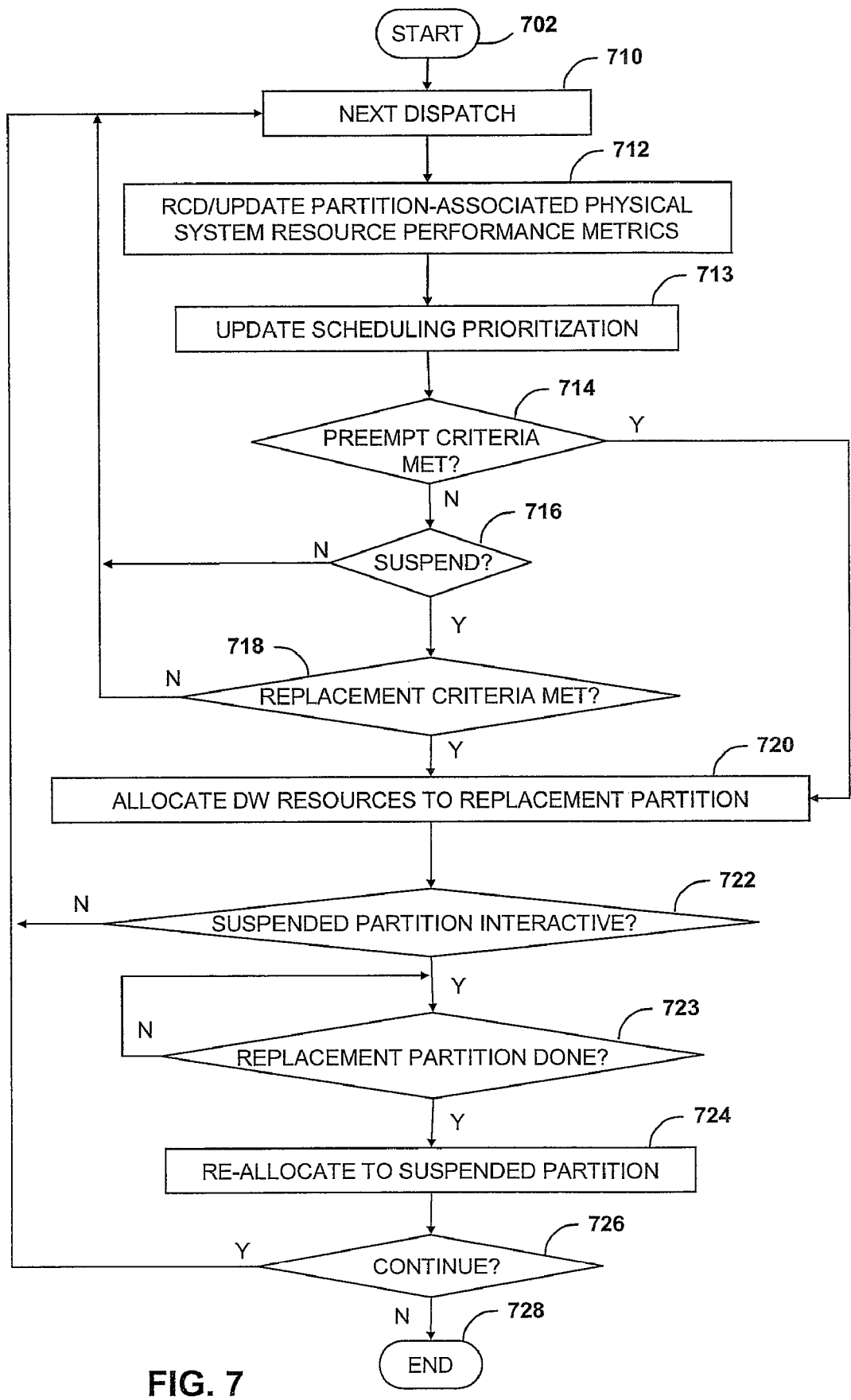
FIG. 7 is a high-level flow diagram illustrating steps performed during a partition dispatch process in which replacement prioritization is utilized to balance workload among logical partitions in accordance with the present invention.
Figure 8A:
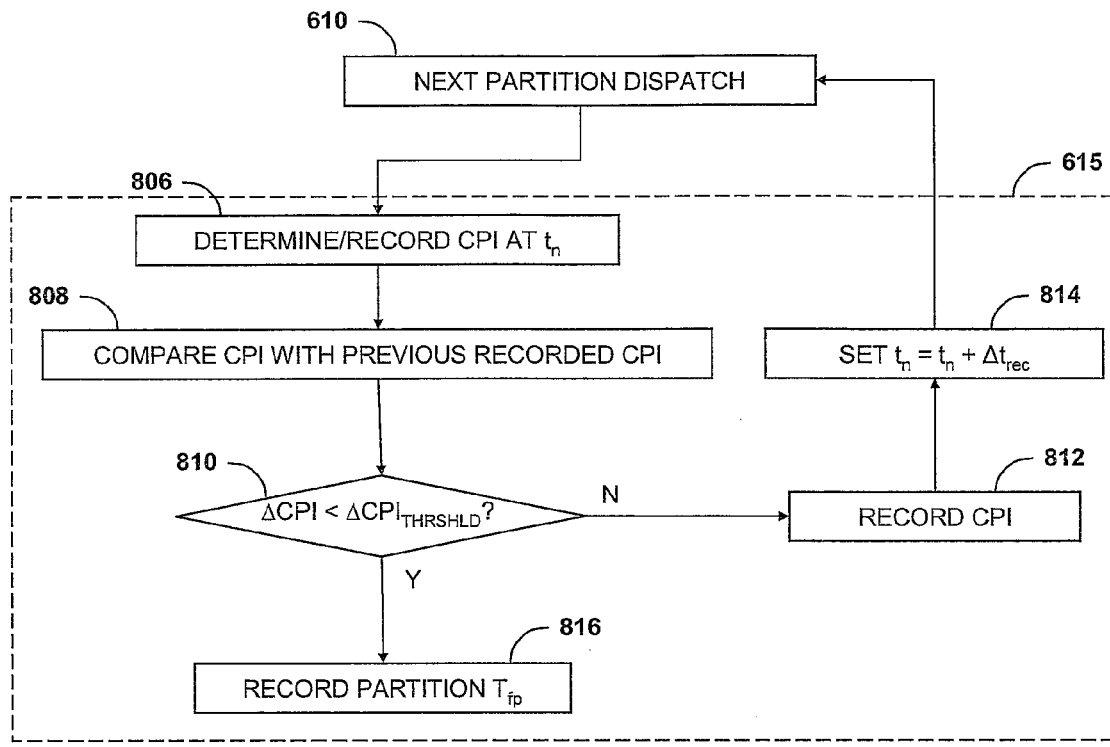
FIG. 8A is a high-level flow diagram depicting steps performed by a partition monitoring unit for determining memory footprint performance metrics utilized for dispatch replacement decisions in accordance with one embodiment of the invention.
Figure 8B:
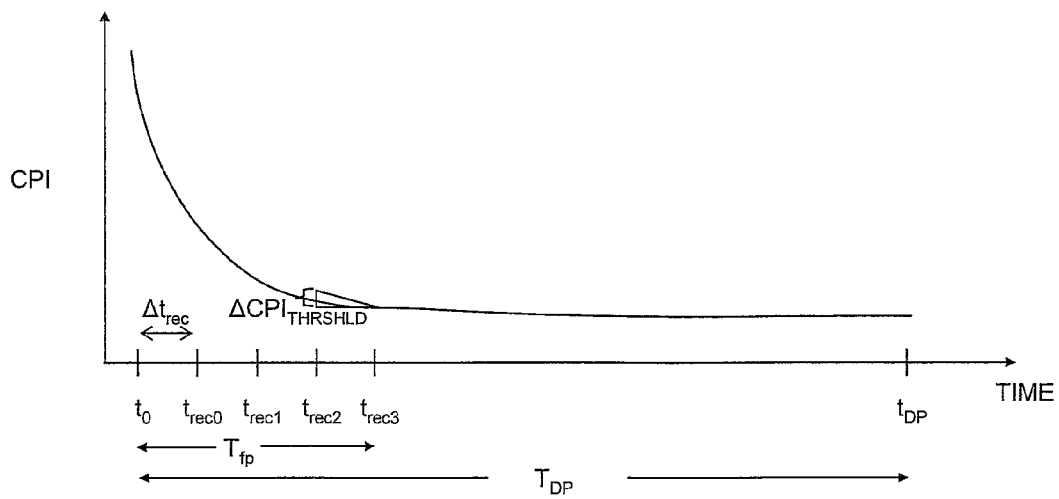
FIG. 8B is a graphical representation of cycles per instruction data as collected over a dispatch window cycle in accordance with the present invention.
Figure 9:
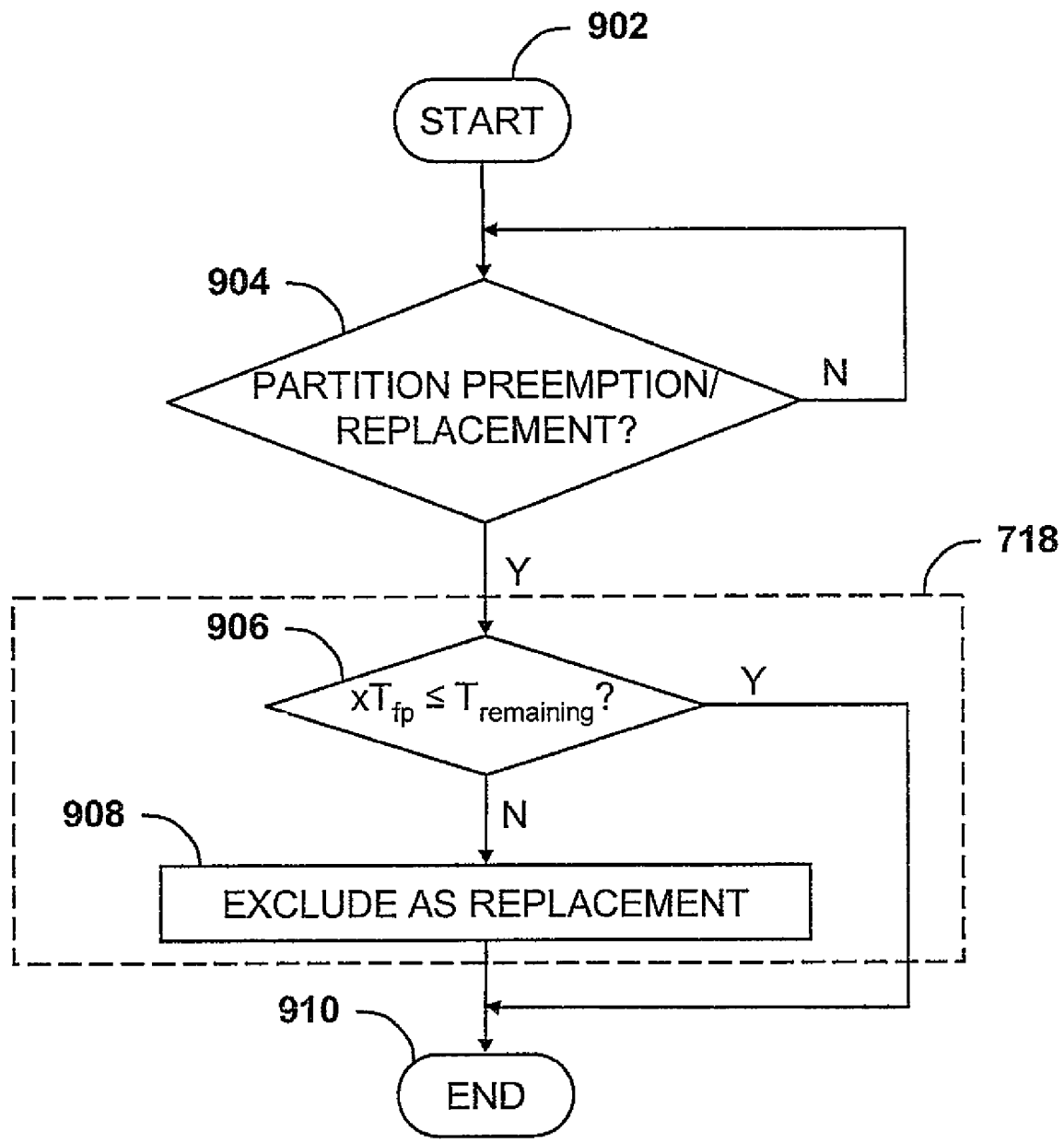
FIG. 9 is a high-level flow diagram illustrating steps performed by a partition scheduler in selecting a replacement partition.

FIGS. 5-9, in conjunction with FIG. 4, illustrate exemplary embodiments of how to integrate partition monitoring functionality into logical partition scheduling particularly as it relates to replacing or preempting dispatched partitions or scheduling partitions following allocation of minimum partition entitlements. First, the partition prioritization sequence shown in FIG. 4 depicts the accumulation and utilization of multiple prioritization factors including hardware-detected physical system performance metrics utilized for setting and adjusting prioritization values for the partitions. FIG. 6 depicts in further detail the computer implemented process by which the hardware-detected physical system performance metrics, and particularly those relating to memory access performance, are determined and tangibly utilized to characterize one or more partition scheduling prioritization factors for each partition. FIGS. 7-9 illustrate computer-implemented processes for determining priority and tuning dispatch windows using partition associated memory footprint metrics. The prioritization characterization and/or scheduler tuning such as depicted in FIGS. 5 and 6 may be employed with a hypervisor dispatcher such as a dispatcher incorporated within hypervisor 115. It should be noted, however, that the inventive features and techniques described herein are not necessarily limited to any one or more of the depicted embodiments. Those skilled in the art will readily appreciate and understand that various aspects of the process of determining and utilizing partition prioritization may be changed without departing from the spirit and scope of the present invention and that furthermore, the fundamental aspect(s) of the mechanism and processes described herein may be utilized with other scheduling algorithms.

Continuing with FIG. 4, a partition $P_i$ is generated having a base priority $bp(P_i)$ 402, which initially may be a null or otherwise neutral value such that it has no effect on partition scheduling/replacement decisions. Base priority value, $bp(P_i)$ may be a numeric or other quantitative value or indicium that may be utilized by hypervisor 115 for making partition preemption and/or replacement decisions. An overall priority value 425 of partition $P_i$ preferably includes a temporal fairness component that dynamically adjusts the base priority $bp(P_i)$ 402. As shown in FIG. 4, the current priority $cp(P_i, t)$ 406 at time t is computed with each time quantum by raising the partition's base priority $bp(P_i)$ by some time dependent increment, d, which is cumulatively represented as a priority summation $d\Sigma t_j$ 404. The current priority $cp(P_i, t)$ 406 therefore includes the base priority plus an incremental fairness component falling somewhere within priority summation $d\Sigma t_j$ 404 depending on the present time interval j. For non-performance metric based partition dispatching, the priority of logical partitions is equal the current priority $cp(P_i, t)$ 406.

The present invention provides a partition scheduling mechanism which further provides and incorporates partition-associated physical system performance metrics to determine the scheduling priority 425 of partition $P_i$. This implies that for multiple logical partitions executing within a virtualized system using a shared set of physical processing resources (processors, memory, etc.), the computation of the priorities for different partitions at the same time may yield different values. In particular, the performance-independent priority of a partition, $cp(P_i, t)$ 406, is adjusted 420 at each scheduling interval by a performance-based factor $\Delta p$ 418. Performance-based factor $\Delta p$ 418 is representative of one of a range of possible specific values by which the priority level of a partition can be increased or decreased using system performance metrics associated with the partition in question. In one embodiment, factor $\Delta p$ 418 is computed by using a reliability factor computation module, $\zeta$ 416 to process a partition cache footprint value $CFP(P_i)$. $CFP(P_i)$ itself is computed as a cache footprint value of partition $P_i$ as quantified by the mechanism of this invention, via one or more logic functions represented by cache footprint computation module $\Theta$ 412. Namely, a set of one or more partition-associated physical resource metrics $PRM(P_i)$ are processed by cache footprint computation module $\Theta$ 412 to determine specified memory footprint values such as $CFP(P_i)$ which are useful for determining partition scheduling priority. Footprint computation module $\Theta$ 412 and reliability factor computation module $\zeta$ 416 establish performance-based factor $\Delta p$ 418. As shown in FIG. 4, the overall priority value for partition $P_i$ at time t is therefore a combined function of a base partition priority, temporal fairness adjustments, and physical system metrics measured in association with the partition.

FIG. 5 is a high-level block diagram representation of a partition dispatcher state as may be implemented within hypervisor 115 for replacing a dispatched but suspended partition in accordance with the present invention. A replacement partition vector or replacement queue 505 is generated and dynamically adjusted by hypervisor 115 in accordance with the methods disclosed herein. Replacement queue 505 is accessed, for example, to determine absolute or relative replacement prioritization when a currently running partition suspends processing during a current dispatch window prior to the dispatch window time quantum expiring. Replacement queue 505 is organized as a queue of prioritized replacement objects, $LP_a$-$LP_n$, in which each object contains or otherwise links to corresponding partition control blocks (PCBs) 502a-502n each maintaining partition state information, such as the partition's configured and adjusted dispatch scheduling status and replacement priority status among other partition-specific data. As shown in FIG. 5, replacement objects $LP_a$-$LP_n$ may be prioritized from "max" (i.e. highest priority among available replacement partitions) to "min" (i.e. lowest priority among available replacement partitions). The components of replacement queue 505 may be advantageously utilized for determining scheduling priority as now explained with reference to FIG. 6.

Referring to FIG. 6, there is illustrated a high-level flow diagram depicting steps performed by partition monitoring unit 204 and hypervisor 115 for determining partition scheduling priority values in accordance with the present invention. The process begins as shown at steps 602 and 604 with the logical partitions being initialized and identified such as by generating corresponding partition control blocks, such as those shown in FIG. 5, for each partition. A base replacement prioritization is set for each of the partitions and is incremented as illustrated at steps 606 and 608. Hypervisor 115 preferably sets and increments the replacement priorities for the partitions in the manner depicted in FIG. 4 in which a temporal fairness scheduling function is utilized to dynamically adjust partition priority values in some normalized manner.

Proceeding as shown at step 610, logical partitions are dispatched in one instance according to configured dispatch window allocation specified by hypervisor 115. During the partition dispatch windows, hardware-based tracking devices and modules, such as those within tracking logic module 302, are utilized to track performance metrics of one or more of the physical system resources in association with respective logical partitions to which the resources are allocated during the dispatch windows (step 615). The performance metric tracking is performed at a hardware level independent of programming interrupts such as operating system interrupts and preferably includes tracking CPI as well as other physical resource processing metrics.

As shown in FIG. 6, tracking physical resource metrics comprises substeps in which the metrics are tracked in association with the dispatched partitions and in which the hardware-detected metrics are utilized to compute or otherwise determine scheduling prioritization values that can be used by hypervisor 115 for partition replacement or other dispatching decisions. As depicted at step 612, the partition-associated physical resource metrics are collected and stored using hardware-level logic and registers at a recording rate having a recording time increment, $\Delta t_{rec}$, which is less than a fraction of a partition dispatch period defined by the dispatch period, $T_{DP}$, divided by an increment factor that is greater than one. Following and/or in conjunction with the hardware detected collection of the physical resource metrics, partition-associated priority values are computed (step 614). The partition-associated priority values are computed from the hardware detected/stored physical system metrics or may be the detected/stored metrics themselves. For example, and with reference to the embodiment shown in FIG. 3, the physical resource metrics collected at step 612 include CPI values collected in dispatched partition vector 308, and the priority values computed at step 614 include memory footprint values computed from the CPI values in a process depicted and described in further detail below with reference to FIGS. 8A and 8B. Concurrent with the performance metric determination at step 615, reliability factors, such as the VAR values depicted within partition history table 305, are preferably computed and updated at each dispatch window for the partitions as shown at step 616.

Referring to FIG. 8A, a more detailed depiction is provided of the processing steps incorporated into step 615. Specifically, FIG. 8A illustrates a high-level flow diagram depicting steps performed such as by PMU 204 and hypervisor 115 for determining memory footprint performance values utilized for dispatch decisions. The process begins with the partition dispatch step 610 and proceeds to step 806 which depicts CPI data being determined and recorded at a time interval point, $t_n$, within the dispatch period of the dispatched partition. The CPI value collected at $t_n$ is compared with a previously recorded CPI value for the same partition. The previously recorded CPI value represents a CPI value determined at an earlier point within a dispatch period for the same partition. An exemplary graphical representation of CPI data as collected at various points in a dispatch period cycle is shown in FIG. 8B. The points at which a dispatch period begins and ends are represented in FIG. 8B as $t_0$ and $t_{DP}$, respectively, over a dispatch period designated by $T_{DP}$. The points at which CPI data are determined and recorded in one or multiple such dispatches for the same partition are represented as $t_{rec0}$, $t_{rec1}$, $t_{rec2}$, $t_{rec3}$, etc. Returning to step 808 of FIG. 8A, the comparison between CPI data values may comprise, for example, a comparison of a CPI value recorded at time $t_{rec2}$ with the CPI value recorded at $t_{rec1}$. In a preferred embodiment, the CPI data determinations at the different time increments are performed across different dispatch periods for a given logical partition.

The present invention accounts for a substantial cost in dispatching relating to the need to re-establish a memory footprint on each partition dispatch. The purpose of the comparison performed at step 808 is to determine the period required by the partition to establish a memory footprint. The memory footprint establishment determination comprises determining a corner point, such as depicted at $t_{rec3}$ in FIG. 8B, at which a CPI value shifts less than a specified threshold value from the CPI value recorded at a previous time increment of a previous dispatch period. In FIG. 8B, time $t_{rec3}$ represents such a corner point at with the CPI value recorded at $t_{rec3}$ differs from the value recorded at $t_{rec2}$ by less than the threshold difference, $\Delta CPI_{THRSHLD}$. The footprint period, $T_{fp}$, is therefore the period between $t_0$ and $t_{rec3}$. The determination of whether the differential between the CPI values is less than a specified threshold is depicted at step 810.

In response to the threshold CPI difference value not being exceeded, the CPI value recorded at step 806 (i.e. the last CPI value) is recorded (step 812) and the recording interval is incremented for the next dispatch period (step 814) prior to returning to the next dispatch of the same partition at step 610. When a given comparison, such as between the CPI value collected at $t_{rec3}$ and that previously collected at $t_{rec2}$, results in the threshold criterion being met, the footprint establishment period for the partition is recorded in association with the partition's identity such as within partition history table 305 (step 816).

Returning to FIG. 6, and proceeding as shown at step 618, hypervisor 115 and/or PMU 204 may determine the dispatch period utilization of each of the logical partitions. The determination at step 618 is utilized to classify each logical partition as either a batch partition that uses substantially all of its configured dispatch period allocation or an interactive partition that is subject to processing interruption in which during a dispatch period the partition must wait for an external event. Dispatched partitions classified as batch partitions will utilize substantially the entire dispatch period while interactive partitions are subject to processing interruptions such as when processing suspends and must wait for a response from another process. If the dispatch period utilization for a given partition exceeds a specified threshold value, which in one embodiment is 95% utilization, the partition is classified as a batch partition (steps 618 and 622). Otherwise, as depicted at steps 618 and 620 the partition is classified as interactive.

The dispatch period utilization classification is included as a field within the partition control block of each partition as previously depicted in FIG. 5, and may be utilized by hypervisor 115 as a scheduling priority criterion. For example, hypervisor 115 may exclude partitions identified as interactive from eligibility as a replacement partition within replacement queue 505 (see FIG. 5). Furthermore, and as explained below with reference to FIG. 7, dispatch period utilization classification may be used by the hypervisor to determine whether or not to re-allocate a remaining portion of a dispatch window to the original partition that has been preempted or replaced.

The process of determining partition scheduling priority values ends as shown at steps 624 and 626 with the priority values such as those stored in partition history table 305 and PCBs 502a-502n being entered or updated. As depicted and explained above with reference to FIGS. 3-5, the hardware detected performance metrics are associated with the logical partitions, such as within partition history table 305, and utilized by hypervisor 115 to determine a prioritization such as that established by replacement queue 505. In a preferred embodiment, the dispatch period utilization classifications and performance metric determinations may be performed during a system startup period which may be measured temporally (five minutes, for example) or by a specified number of rotations through the partition dispatch queue. Following collection of at least an initial set of prioritization data, hypervisor 115 utilizes the data for replacement and possibly preemption of dispatched partitions and other scheduling decisions.

FIG. 7 is a high-level flow diagram illustrating steps performed by a dispatcher such as a dispatcher within hypervisor 115 to balance workload among logical partitions in accordance with the present invention. The process begins as shown at steps 702 and 710 with hypervisor 115 dispatching the next set of one or more partitions in accordance with system configured partition scheduling. During the present dispatch cycle, physical system resource metrics including CPI and CLC for the dispatched partitions are recorded and updated (step 712) and replacement prioritization values such as those computed at step 614 of FIG. 6 are updated (step 713).

As depicted at step 714, hypervisor 115 may determine whether a given dispatched partition may be preempted in accordance with the partition replacement prioritization data. As utilized herein, partition preemption is similar to and includes many of the same mechanisms employed in replacement of a dispatched partition that has ceded during a dispatch window. The difference is that partition preemption may not require the replaced partition to have suspended processing as a condition triggering the replacement steps described herein. As shown at steps 714 and 720, responsive to determining that pre-specified preemption criteria have been met for a given dispatched partition in view of prioritization values such as those contained in partition history table 305, hypervisor 115 suspends the dispatched partition and allocates the system resources to a selected partition for the remainder (possible the entirety) of the dispatch window. The replacement partition is selected in accordance with the replacement priority data in a manner the same as or similar to the scheduling prioritization steps described below with reference to step 718 and FIG. 9. Hypervisor 115 uses prioritization data within replacement queue 505 and partition control blocks 502a-502n to determine whether a next-to-be dispatched or otherwise presently dispatched partition will be preempted by a selected replacement partition.

If the preemption criteria are not met (step 714) and the originally scheduled partition utilizes its entire dispatch allocation period (i.e. partition does not suspend processing) (step 716), the hypervisor dispatching/load balancing process continues with the next dispatch at step 710.

If a dispatched and non-preempted partition suspends processing during the dispatch window period (step 716), hypervisor 115 processes the replacement prioritization data provided by replacement queue 505 and/or the partition control blocks 502a-502n for available partitions to determine whether pre-specified partition replacement criteria have been met (step 718).

The replacement determination depicted at step 718 preferably includes assessing the replacement priority values of the presently idle logical partitions to determine which among the partitions is eligible to replace the presently suspended partition. The replacement eligibility determination assesses one or more of the partition replacement priority values, such as memory footprint values, included in the partition control blocks 502a-502n in view of limitations imposed such as be the limited remaining portion of the dispatch window. For example, the originally dispatched partition has a partition window period, $T_{DW}$, which for IBM's POWER5 architecture is 10 msec. The dispatch window period, $T_{DW}$, is effectively divided by a dispatch increment, $T_{DPSTCH}$, which is the configured minimum run time increment for partitions and consequently the minimum increment at which hypervisor 115 may replace or preempt a dispatched partition. Under these circumstances, the replacement criteria determination at step 718 includes determining which of the available replacement partitions are eligible in view of the limits imposed by $T_{DPSTCH}$ and the remaining portion of $T_{DW}$ for the suspended partition.

The present invention includes a dispatch selection feature that ensures a specified level of scheduling efficiency. Namely, and referring to FIG. 9, there is depicted a high-level flow diagram illustrating steps performed by a partition scheduler in determining whether replacement criteria have been met (step 718) and in selecting a replacement partition I a manner ensuring a specified level of processing efficiency. The process begins as shown at steps 902 and 904 with a replacement event such as preemption criteria being met or a dispatched partition suspending prompting the replacement criteria determination. The replacement criteria determination shown at step 718 contains substeps 906 and 908 for selecting a replacement partition using both the memory footprint priority values for the available partitions as well as the remaining available portion of the dispatch window.

Step 906 illustrates a determination of whether the footprint establishment period, $T_{fp}$, for an available replacement partition, as may be recorded in a partition control block and/or partition history table 305, is less than the remaining portion of the dispatch window, $T_{remaining}$. In addition, the determination shown at step 906 utilizes a tunable factor, x, that may be set to a value greater than one to determine whether the $T_{fp}$ value for a partition forms a sufficiently small fraction of the available dispatch window period, $T_{remaining}$, that the replacement partition can achieve a specified level of processing efficiency. In one embodiment, for example, hypervisor 115 makes the replacement decision at step 718 in accordance with whether the replacement logical partition has a determined memory footprint value, $T_{fp}$, that satisfies the relation $xT_{fp} \leq T_{remaining}$, wherein x is greater than one and preferably at least 10.

If, as shown at steps 906 and 908 the replacement priority value assessment criteria are not met, the partition is excluded as a possible replacement. Step 906 is performed for one or more of the partitions until the replacement criteria are met and the process ends as shown at step 910.

Returning to FIG. 7, response to selecting a replacement partition, hypervisor 115 deallocates the dispatch window resources from the replaced partition and allocates the resources to the selected replacement partition (step 720). If the replaced partition has been classified, as depicted and described with reference to FIGS. 5 and 6, as non-interactive (i.e. batch), the replacement partition consumes the remaining dispatch window period and the process returns to the next dispatch cycle (steps 722 and 710). If, however, the replaced partition is an interactive partition (step 722), the replacement partition is dispatched for a subset of the remaining dispatch window period (step 723). Following completion of the replacement dispatch period, the dispatch window resources are re-allocated to the original replaced partition (step 724) and the process continues (step 726) or concludes (step 728).

Figure 10:
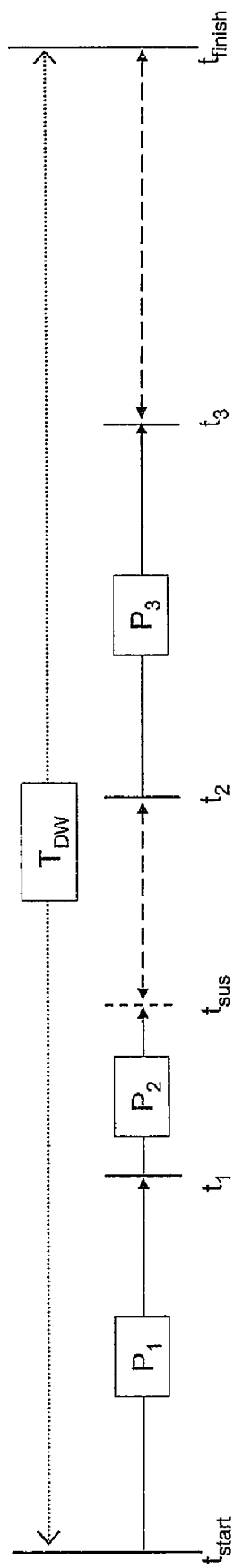
FIG. 10 illustrates partition scheduling within a dispatch window in accordance with the invention.

FIG. 10 illustrates partition scheduling within a dispatch window in accordance with the invention. The dispatch window shown in FIG. 10 is defined in part as having a configured dispatch window period, $T_{DW}$, beginning at $t_{start}$ and ending at $t_{finish}$ and which is implemented by a counter feature (not expressly depicted in the figures) within hypervisor 115 that provides hypervisor 115 with a timed interrupt of partition activity over specified dispatch window intervals. In the depicted embodiment, partitions represented as $P_1$, $P_2$, and $P_3$ are dispatched by hypervisor 115 at interleaved time intervals beginning at times $t_{start}$, $t_1$, and $t_2$, respectively, within the dispatch window. As per logical partition scheduling convention, partitions $P_1$, $P_2$, and $P_3$ each have pre-configured dispatch period entitlements that hypervisor 115 uses for scheduling to ensure that the partitions receive their respective minimum entitlements.

In the depicted embodiment, the minimum entitlements for partitions $P_1$, $P_2$, and $P_3$ are depicted in FIG. 10 as the periods from $t_{start}$-$t_1$, $t_1$-$t_2$, and $t_2$-$t_3$, respectively. Following entitlement periods is a remaining period from $t_3$-$t_{finish}$ in which partitions $P_1$, $P_2$, and $P_3$ may be dispatched by hypervisor 115 in accordance with fairness and scheduling prioritization factors. Furthermore, and as explained above, the partitions may suspend processing as is illustrated for partition $P_2$ within its entitled dispatch period.

Figure 11:
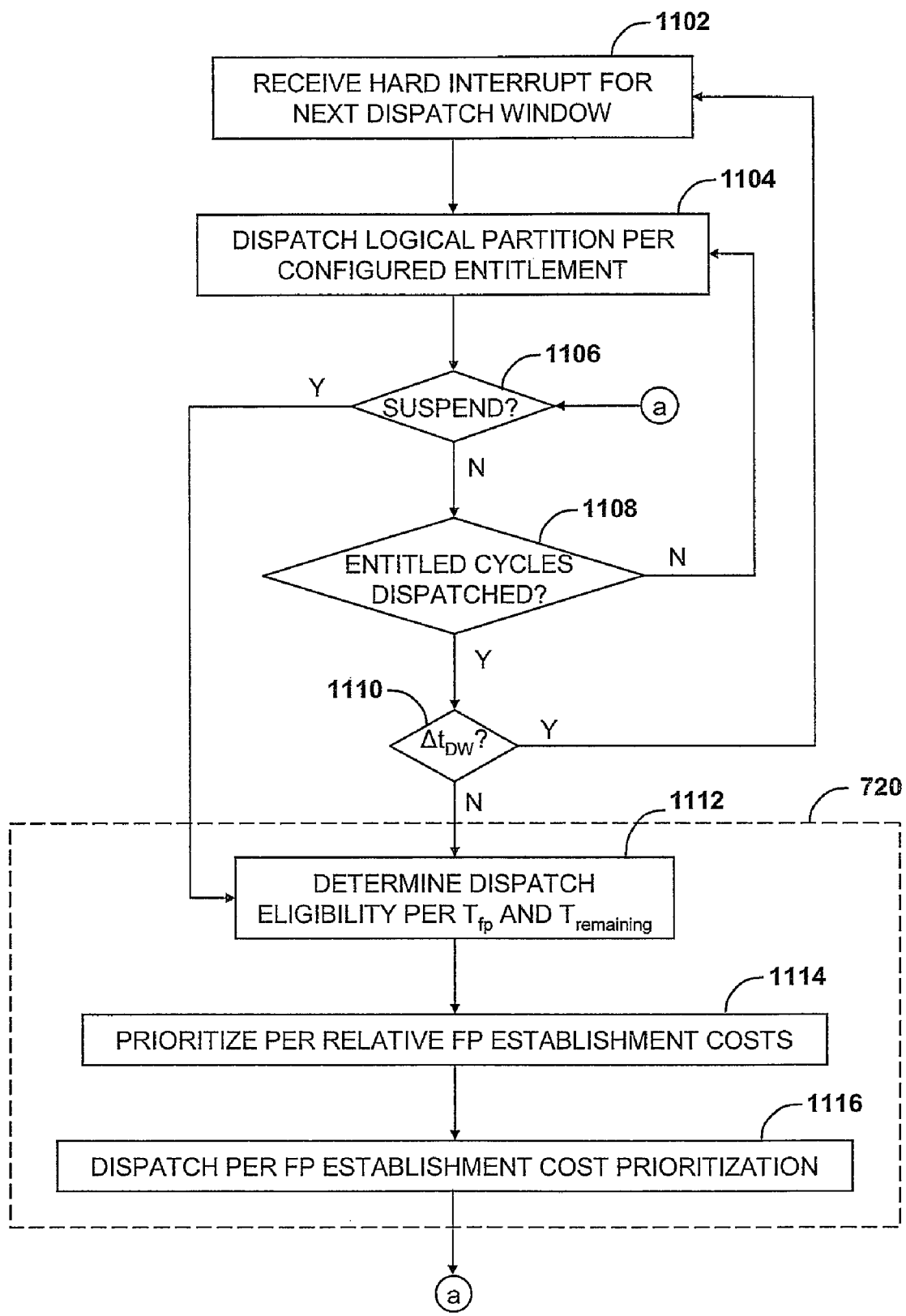
FIG. 11 is a high-level flow diagram depicting steps performed by a partition monitoring unit for dynamically tuning a partition scheduler during a dispatch window in accordance with the present invention.

FIG. 11 is a high-level flow diagram depicting partition scheduling tuning such as during the dispatch window shown in FIG. 10 in accordance with the invention. The process begins as depicted at step 1102 with receipt of a hard (i.e. independent of partition activity) interrupt signaling the beginning of the next dispatch window. Proceeding as shown at step 1104, a logical partition, such as one of partitions $P_1$, $P_2$, and $P_3$ is dispatched for periods accommodating the configured cycles entitlement of the partition. Referring to FIG. 10, the first dispatch period is for partition $P_1$ dispatched at $t_{start}$ for a specified number of cycles.

If the logical processor belonging to the dispatched partition does not suspend processing (step 1106), such as for partition $P_1$ dispatched from $t_{start}$-$t_1$, and further entitlement allocation is required (step 1108), the next scheduled partition (e.g. partition $P_2$) is dispatched (step 1104). If the entire dispatch window period is consumed (step 1110) following allocation of minimum entitlements (step 1108), the process returns to step 1102 for the next dispatch window period.

In addition to dispatching to meet partition entitlements, hypervisor 115 preferably utilizes prioritization factors such as memory footprint values derived from partition-associated performance metrics among other scheduling heuristics to dynamically schedule the partitions. One circumstance in which hypervisor 115 employs the performance metric derived prioritization for scheduling is shown in FIG. 11 as a suspended logical processor condition (step 1106) depicted in FIG. 10 at $t_{sus}$ at which point partition $P_2$ has suspended processing. The other such circumstance illustrated in FIG. 11 is the post-entitlement scheduling beginning at $t_3$ at which additional cycles remain in the dispatch window (steps 1108 and 1110).

Responsive to suspended processing of a partition (step 1106) or availability of extra cycles in the dispatch window, hypervisor 115 commences dispatching at step 720 including the following substeps. The dispatch eligibility of the partitions is determined by comparing the time to establish a memory footprint for each of the partitions with the time remaining in the dispatch window (step 1112). The partitions eligible per step 1112 are then prioritized in accordance with their respective footprint establishment costs as illustrated at step 1114. For example, the stored statistics indicate the amount of time required for each partition to establish a memory footprint. As explained above with reference to FIG. 9, the memory footprint establishment periods can be used to determine the relative efficiency of dispatching a particular partition with a limited dispatch window period remaining. The prioritization performed at step 1114 may therefore include the steps depicted in FIGS. 4 and 9. A partition selected in accordance with the prioritization at step 1114 is dispatched as shown at step 1116.

The disclosed methods may be readily implemented in software using object or object-oriented software development environments that provide portable source code that can be used on a variety of computer or workstation hardware platforms. In this instance, the methods and systems of the invention can be implemented as a routine embedded on a personal computer such as a Java or CGI script, as a resource residing on a server or graphics workstation, as a routine embedded in a dedicated source code editor management system, or the like.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A method for dynamically tuning a scheduler that determines dispatch scheduling among multiple logical partitions that share physical system resources, said method comprising:

during logical partition dispatching, collecting performance metrics of one or more of the physical system resources in association with each of the multiple logical partitions;

processing the performance metrics to determine memory footprint values for the multiple logical partitions; and dynamically adjusting dispatching priorities of the multiple logical partitions in accordance with variations in the determined memory footprint values and dispatching at least one logical partition among the multiple partitions for processing in accordance with the dispatching priorities.

2. The method of claim 1, wherein said method further comprises:

during a dispatch window in which a given set of the physical system resources are pre-configured for allocation to one of the multiple logical partitions, allocating the given set of physical system resources to a replacement logical partition in accordance with the collected performance metrics associated with the replacement logical partition.

3. The method of claim 1, wherein:

the dispatching includes dispatching a logical processor of one of the multiple logical partitions during a dispatch window, wherein said dispatching includes allocating a pre-specified period during which a given set of physical system resources are allocated for use by the one of the logical partitions; and the method further comprises responsive to the dispatched logical processor suspending processing during the pre-specified period, selecting another of the logical partitions to allocate the given set of physical system resources to for a remaining portion of the pre-specified period, said selecting performed in accordance with the collected performance metrics associated with the another of the multiple logical partitions.

4. The method of claim 3, further comprising allocating the given set of the physical system resources to said another of the multiple logical partitions in accordance with whether the another of the multiple logical partitions has a determined memory footprint value, $T_{fp}$, that satisfies:

$x*T_{fp} \leq T_{unutilized}$, wherein $T_{unutilized}$ represents an unutilized portion of a dispatch window period and x is an efficiency multiplier greater than one.

5. The method of claim 1, wherein the performance metrics include cycles per instruction data, and wherein the memory footprint values include a period for a logical partition to establish a memory footprint.

6. The method of claim 5, wherein the period for establishing a memory footprint is determined by detecting a corner point at which a cycles per instruction value within a dispatch period for a given logical partition shifts less than a threshold cycles per instruction value for that given logical partition determined at a previous point within the dispatch period.

7. A data processing system that dynamically tunes dispatch scheduling among multiple logical partitions that share physical system resources, said data processing system comprising:
    physical system resources including at least one physical processor and a memory system including a shared memory shared by the multiple logical partitions;
    partition monitoring logic that, during logical partition dispatching, collects performance metrics of one or more of the physical system resources in association with each of the multiple logical partitions and processes the performance metrics to determine memory footprint values for the multiple logical partitions; and
    partition scheduling logic that dynamically adjusts dispatching priorities of the multiple logical partitions in accordance with variations in the determined memory footprint values and dispatches at least one logical partition among the multiple partitions for processing in accordance with the dispatching priorities.

8. The system of claim 7, wherein said partition scheduling logic, during a dispatch window in which a given set of the physical system resources are pre-configured for allocation to one of the multiple logical partitions, allocates the given set of physical system resources to a replacement logical partition in accordance with the collected performance metrics associated with the replacement logical partition.

9. The system of claim 7, wherein:
    the partition scheduling logic dispatches a logical processor of one of the multiple logical partitions during a dispatch window, and dispatching the logical processor includes allocating a pre-specified period during which a given set of physical system resources are allocated for use by the one of the multiple logical partitions; and
    the partition scheduling logic, responsive to the dispatched logical processor suspending processing during the pre-specified period, selects another of the multiple logical partitions to which to allocate the given set of physical system resources for a remaining portion of the pre-specified period in accordance with the collected performance metrics associated with the another of the multiple logical partitions.

10. The system of claim 9, wherein the partition scheduling logic allocates the given set of the physical system resources to said another of the multiple logical partitions in accordance with whether the another of the multiple logical partitions has a determined memory footprint value, $T_{fp}$, that satisfies:
    $x*T_{fp} \leq T_{unutilized}$, wherein $T_{unutilized}$ represents an unutilized portion of a dispatch window period and x is an efficiency multiplier greater than one.

11. The system of claim 7, wherein the performance metrics include cycles per instruction data, and wherein the memory footprint values include a period for a logical partition to establish a memory footprint.

12. The system of claim 11, wherein the partition monitoring logic determines the period for establishing a memory footprint by detecting a corner point at which a cycles per instruction value within a dispatch period for a given logical partition shifts less than a threshold value cycles per instruction value for that given logical partition at a previous point within the dispatch period.

13. A program product, comprising:
    a computer-readable storage medium; and
    computer-executable instructions stored within the computer-readable storage medium for dynamically tuning a scheduler that determines dispatch scheduling among multiple logical partitions that share physical system resources, wherein when executed by a computer said computer-executable instructions cause the computer to perform:
        during logical partition dispatching, collecting performance metrics of one or more of the physical system resources in association with each of the multiple logical partitions;
        processing the performance metrics to determine memory footprint values for the multiple logical partitions; and
        dynamically adjusting dispatching priorities of the multiple logical partitions in accordance with variations in the determined memory footprint values and dispatching at least one logical partition among the multiple partitions for processing in accordance with the dispatching priorities.

14. The program product of claim 13, wherein said dynamically adjusting dispatching of partitions further comprises, during a dispatch window in which a given set of the physical system resources are pre-configured for allocation to one of the multiple logical partitions, allocating the given set of physical system resources to a replacement logical partition in accordance with the collected performance metrics associated with the replacement logical partition.

15. The program product of claim 13, wherein:
    the dispatching includes dispatching a logical processor of one of the multiple logical partitions during a dispatch window, wherein said dispatching includes allocating a pre-specified period during which a given set of physical system resources are allocated for use by the one of the logical partitions; and
    the computer-executable instructions further cause the computer to perform:
        responsive to the dispatched logical processor suspending processing during the pre-specified period, selecting another of the logical partitions to allocate the given set of physical system resources to for a remaining portion of the pre-specified period, said selecting performed in accordance with the collected performance metrics associated with the another of the multiple logical partitions.

16. The program product of claim 15, wherein said computer-executable instructions further perform allocating the given set of the physical system resources to said another of the multiple logical partitions in accordance with whether the another of the multiple logical partitions has a determined memory footprint value, $T_{fp}$, that satisfies:
    $x*T_{fp} \geq T_{unutilized}$, wherein $T_{unutilized}$ represents an unutilized portion of a dispatch window period and x is an efficiency multiplier greater than one.

17. The program product of claim 13, wherein the performance metrics include cycles per instruction data, and wherein the memory footprint values include a period for a logical partition to establish a memory footprint.

18. The program product of claim 17, wherein the period for establishing a memory footprint is determined by detecting a corner point at which a cycles per instruction value within a dispatch period for a given logical partition shifts less than a threshold cycles per instruction value for that given logical partition determined at a previous point within the dispatch period.

* * * * *